United States Patent Office 3,314,883
Patented Apr. 18, 1967

3,314,883
DRILLING FLUID
Clarence O. Walker, Houston, Tex., assignor to Texaco Inc., New York, N.Y., a corporation of Delaware
No Drawing. Filed Mar. 26, 1965, Ser. No. 443,171
14 Claims. (Cl. 252—8.5)

This application is a continuation-in-part of application Ser. No. 119,804, filed June 27, 1961, now abandoned.

This invention relates to a novel aqueous drilling fluid for drilling wells through sub-surface formations by means of well drilling tools, and particularly to such an aqueous well drilling fluid having both improved dispersibility and improved high temperature stability as a result of including a novel modified starch dextrin material as an essential ingredient thereof. The invention is also concerned with a method of drilling wells employing the novel aqueous drilling fluid, a novel process for producing the novel modified starch dextrin, and the novel modified starch dextrin itself as a composition of matter.

Drilling fluids, or muds as they are sometimes called, are slurries of clayey solids used in the drilling of wells for tapping underground collections of oil, gas, brine, or water. Such fluids have a number of different functions, the most important of which are to assist in the removal of cuttings from the well, to seal off formations of gas, oil, or water which may be encountered at different levels, to lubricate the drilling tool and drill pipe which carries the tool, and to hold the cuttings in suspension in event of shut-downs in drilling.

An ideal drilling fluid is a thixotropic colloidal system, i.e., a fluid which on agitation or circulation (as by pumping or otherwise), has a measurable relatively low viscosity and is free flowing (not plastic), particularly at high temperatures; but when such agitation or circulation is halted, the fluid sets or gels. On a high temperature basis a gel strength or shear below 500 pounds per 100 square feet is advantageous. The rate of gel formation is such as to permit the cuttings to fall only a short distance before the gel structure is sufficiently strong to support them.

When such a drilling fluid having the proper viscosity, the proper gel rate and proper gel strength is circulated through a well bore, it has a sufficient high viscosity to carry the cuttings and sand from the bottom of the hole to the surface and it has a gel rate such as to allow the cuttings and sand to settle in a settling pit. On standing in a quiescent state, it develops sufficient gel strength to prevent the settling of the cuttings, sand or weighting material, etc., in the well bore when it becomes necessary to discontinue circulation for any appreciable period of time. Such a fluid is also characterized by its ability to form a mud cake on the bore hole wall, thereby assisting in sealing off the traversed formations and inhibiting so-called water loss, i.e., loss of water from the drilling fluid.

One of the principal problems in mud chemistry is the production of suitable drilling fluids having satisfactory dispersibility, and the necessary thixotropic properties discussed above. This problem is of particular importance when drilling extremely deep wells, which may range from 12,000 to 20,000 feet or more in depth in modern drilling technology. At such depths the temperature rises to a high value and may at times be as high as 250–450° F.

Under such high temperature conditions ordinary muds tend to lose their stability and to thicken in the hole, as to a shear value in excess of 500 pounds per 100 square feet thus hampering the drilling operation seriously.

In accordance with the application Ser. No. 97,151 dated Mar. 21, 1961, now abandoned, the problems of dispersibility and high temperature stability can be solved in a very satisfactory manner by providing an aqueous well drilling fluid containing a sufficient amount (e.g., 0.5 to 15 pounds per bbl. of fluid) of a polyanionic material which has been produced by subjecting a starchy material to a dextrinization temperature between about 300 and 400° F. for a period of time of at least 36 hours. Advantageously, the temperature of dextrinization is about 350° F. for the most satisfactory results; and a period of heating should be used of approximately one week (168 hours). Beyond a heating period of 3 weeks (504 hours) improved results commensurate with the greater expense are not realized.

While the previous procedure has given excellent results, heating of the starchy material for 36 hours or more was so time consuming and expensive that research was instituted for a more rapid and less expensive procedure for producing a satisfactory product. In accordance with the present invention this objective was reached by employing as a starting material a preoxidized starch, and heating it at a temperature above 300° F., but below a temperature at which burning of the starch occurs for only a short period of time, as between at least about 15 minutes and 6 hours. Most advantageously the temperature should be between 350 and 400° F. while the time of heating should be between 1 and 3 hours. A time period of two hours at 400° F. has been found to give consistently good results.

Excellent results are obtained when incorporating this novel material in drilling muds, in an amount of from about 0.5 pound per bbl. of mud, e.g., between 0.5 and 15 pounds per bbl., preferably in the range of from about 3 to 7.5 pounds per bbl.

Uniform heating of the preoxidized starch can be accomplished in a shallow dish or tray placed in an oven, with the access of air. Another way to heat the starch is in a rotating steel drum in an oven. The starch also can be heated in a bed while blowing through it a gas such as air.

Preoxidized starches are well known commercial products whose general commercial preparation is described by R. W. Kerr in "Chemistry and Industry of Starch," page 237 (1944 ed.), as follows:

"The general commercial method for producing hypochlorite-oxidized starches consists of treating aqueous starch suspension (about 36%) with a hypochlorite solution (6 to 8% active chlorine) containing a slight excess of alkali. The hypochlorite solution is added in small portions so that the heat generated can be dissipated by the cooling system, the general practice being to keep the temperature between 90° and 125° F. The heat produced is probably due to three exothermic reactions: (1) the heat of adsorption, (2) the heat of decomposition of the hypochlorite, and (3) the heat generated in oxidizing the starch. When the reaction is judged to be approaching the desired degree of oxidation, a sample of the starch milk is removed, filtered, and washed on a vacuum filter, and the fluidity of a paste of definite concentration prepared from the cake is then determined. When a product of the desired fluidity is obtained the oxidation is stopped by adding an antichlor (usually sodium bisulfite), and the slurry is adjusted to the desired pH (usually 3 to 7), filtered, washed, water removed to about a 47 to 50% moisture content, and dried. By varying the quantity of hypochlorite used and the time, temperature, and pH of the reaction, an entire series of oxidized starches can be produced."

Another description appears in Encyclopedia of Chemical Technology, vol. 12, page 771 (1954 ed.) as follows:

"The method of manufacturing chlorinated starches consists essentially of suspending undried starch in aqueous slurry at temperatures between 25 and 35° C. and adding predetermined quantities of sodium or calcium hypochlorite, together with sufficient amounts of the corresponding hydroxide to maintain an alkaline condition throughout the reaction. The amount of hypochlorite added is usually equivalent to between 0.5 to 6.0% available chlorine, based on starch, and is determined by the fluidity grade of starch to be made; the more reagent added the less will be the viscosity of the starch when gelatinized. (Small amounts of oxidants such as hypochlorites or permanganates may be used for the purpose of bleaching the starch for specific uses.) Following a reaction period of 5–24 hours, the starch is adjusted to neutrality, thoroughly washed with water, and dried. These relatively thin-boiling, oxidized starch products are sold by several manufacturers under trade-marked names such as Hercules, Stayco, Nalex and Abinco. The soluble by-products are washed from the starch before drying."

A modified starch dextrin produced by the process steps described above is characterized by a color which ranges from brown to red by relatively low water solubility compared with ordinary dextrin, solubility in boiling water being as little as 10% or less by weight (90% or more insoluble solids) compared to 100% for yellow dextrin. However, it is fully soluble in aqueous caustic solutions.

Many of the experimental determinations described hereinafter were conducted for convenience upon calcium base shale control drilling muds of the type described in detail in U.S. Patent 2,802,783. Such a mud comprises clayey solids suspended in an alkaline aqueous phase which consists essentially of a saturated aqueous calcium hydroxide solution and a water soluble calcium salt which has a solubility in the aqueous phase greater than that of calcium hydroxide dissolved therein, to yield a calcium ion concentration in the aqueous phase of at least 200 p.p.m. by weight, and sufficient to stabilize and control the mud making properties of heaving shale material in contact with the mud. However, the principles of the invention are applicable to other types of muds.

A general discussion of high temperature phenomena follows, with particular reference to the significance of shear or gel strength measurements, and the viscosity of samples:

In general, some degree of high temperature gelation occurs in most clay-water systems when exposed to temperatures above normal. High temperatures affect muds in two distinct manners. Under static conditions temperature accelerates the development of gel structure in the mud. The end result of this gel development will depend upon the temperature, time for development, and susceptibility of the mud to gelation. The strength of the gel developed will range from a low, easily measured gel, through plasticity to a rigid cement-like mass which practically defies classification as a gel.

A second high temperature reaction is the effect on viscosity. As with the gel development, temperature may have little or no effect on the viscosity of the mud or may thicken the mud to a point where it becomes practically unpumpable. The end viscosity of a mud appears to be independent of whether the mud has been continually agitated or remained quiescent during the heating cycle. The effect of temperature on the physical properties of muds may be classified into three characteristic patterns.

*Normal response to temperature*

Drilling mud slurries possess a property known as thixotropy. Therefore the clay particles of the slurry tend to orient themselves with time under a static condition to produce a semi-rigid gel structure. Elevated temperatures tend to accelerate the rate of formation and development of this property to such an extent that muds often develop gel structures of appreciable strength.

Muds possessing a normal response to temperature will refluidize to a condition approximating their original viscosity when subjected to mechanical agitation.

*Abnormal response to temperature*

In a second response to temperature, which is called high temperature gelation, the muds undergo gelation to yield similar semi-rigid structures; but these gels are not thixotropic. Therefore, the muds will not refluidize satisfactorily but remain as highly viscous to semi-plastic slurries.

The degree of gelation cannot of itself be used to distinguish muds of this type for, although the degree of gelation in muds of this type is usually somewhat higher than in muds possessing normal temperature response, there can be appreciable overlap between the two types. The important criterion is the retention or loss of thixotropic response following high temperature aging.

*High temperature solidification*

The most severe reaction to temperature is often referred to as high temperature solidification. In this case a more complex rigid structure is formed which in severe cases approaches a cement-like solid consistency. These muds usually have lost any resemblance to a thixotropic fluid and upon agitation may tend to granulate and crumble into a discontinuous mass.

In the tables fluidity of a mud is reported in Fann readings as determined by the procedure more fully described in the publication American Petroleum Institute RP–29 for a direct-indicating viscometer. Gel strength (Gels) is reported as determined by a shearometer (API RP–29), results being expressed either as pounds/100 square feet, or as time in seconds for a tube to settle in the mud (after the mud has stood for zero time and for 10 minutes). If the tube settles in less than 60 seconds, the shear is reported as $O^t$ where $t$ is time in sceonds. If it settles in more than 60 seconds, shear is reported as pounds per hundred square feet.

Plastic Viscosity (PV) is obtained by calculation, and the difference between viscosities measured at 600 and 300 r.p.m. Yield Point (YP) represents the value of the Fann reading at 300 r.p.m. minus the Plastic Viscosity.

In the following Table I, incorporating Examples 1 to 21, samples of commercially available hypochlorite oxidized corn starches identified as A, B, and C were non-catalytically heated at the temperatures and for the times indicated in a tray 15″ x 18″ x ¼″ using a ¼″ sample depth. The resulting modified starch dextrins were incorporated as thinners or dispersants in a West Cote Blanche waterbase top hole drilling mud containing about 15% by volume of low gravity clay solids to form a shale control mud containing 3.5 lbs./bbl. dextrin thinner, 3.0 lbs./bbl. lime, 0.98 lb./bbl. calcium chloride, balance water. In some examples there was added to the mud 0.25 gram of NaOH per barrel to offset the acidic effect of the thinning agent and adjust the pH to comparable values. In all cases the pH was between 12.2 and 12.3 and the Pm (phenolphthalein end point) was between 8.4 and 10.1. Comparative tests were also carried out on the base mud alone and containing either calcium lignosulfonate (a commercial thinner known as Kembreak), or the base mud containing dextrin prepared by heating pearl grade corn starch 5½ hours at 400° F. (Example 2) and containing dextrin prepared in accordance with the parent application by heating food grade corn starch 168 hours at 350° F. (Example 3).

Table III below shows the properties of aqueous drilling fluids containing the novel dispersant of the present invention and also presents comparative data with another dispersant, Kembreak, a widely used calcium lignosulfonate drilling fluid dispersant. The data in the table show that the novel dispersant of the present invention imparts a much lower Yield Point to the drilling fluid containing same and also a marked decrease in Gel Strength at 0 and 10 minutes, respectively, than the drilling fluid containing Kembreak as the dispersant. The table further shows that the High Temperature Gel Strength of the drilling fluid containing the dispersant of the present invention is materially lower than that of the drilling fluid containing the calcium lignosulfonate dispersant.

TABLE III

| Ex. | Dispersant | Fann Reading, r.p.m. | | PV | YP | Gels | | Ca (p.p.m.) | Gel Strength, lbs./100 ft.$^2$ (after mud heated at 300° F. for 26 hrs. without agitation) |
|---|---|---|---|---|---|---|---|---|---|
| | | 600 | 300 | | | 0' | 10' | | |
| 22 | Kembreak | 98.5 | 64.5 | 34 | 30.5 | 11 | 11 | 656 | 1,115 |
| 23 | C—2 h./400 | 96.5 | 48.5 | 48 | .5 | 0.8 | 0$^{15}$ | 624 | 245 |
| 24 | A—2 h./400 | 87.5 | 47 | 40.5 | 6.5 | 0$^1$ | 0$^{55}$ | 648 | 260 |
| 25 | C—20 m/454 | 117 | 65 | 52 | 13 | 0$^3$ | 5.3 | 560 | 345 |
| 26 | C—1 h./428 | 60 | 33.5 | 26.5 | 7 | 0.8 | 0$^{50}$ | 616 | 265 |
| 27 | A—1 h./428 | 64.5 | 38.5 | 25.5 | 13 | 0$^5$ | 4.4 | 544 | 195 |
| 28 | B—1 h./428 | 90 | 49 | 41 | 8 | 0$^{2.2}$ | 4.7 | 560 | 375 |

TABLE I

| Ex. | Thinner | Fann Reading, r.p.m. | | PV | YP | Gels | | Ca (p.p.m.) |
|---|---|---|---|---|---|---|---|---|
| | | 600$^1$ | 300 | | | 0' | 10' | |
| Base Mud $^2$ | None | 70 | 59 | 11 | 48 | 50 | 60 | |
| 1 | Kembreak | 128.5 | 90 | 38.5 | 51.5 | 18 | 18 | 744 |
| 2 | Starch, 5½ h./400$^3$ | 129.5 | 81 | 48.5 | 32.5 | 0$^1$ | 6 | 656 |
| 3 | Starch 168 h./350 | 40 | 27.5 | 12.5 | 15 | 3.5 | 3.5 | 616 |
| | 400° F. | | | | | | | |
| 4 | A—1 h | 87.5 | 43.5 | 44 | 0 | 0$^1$ | 0$^{26.3}$ | 552 |
| 5 | A—1¼ h | 71 | 33.5 | 37.5 | 0 | 0$^3$ | 0$^{9.2}$ | 616 |
| 6 | A—1½ h | 84.5 | 41.5 | 43 | 0 | 0$^1$ | 0$^{18}$ | 624 |
| 7 | Ex. 6 + .25g. NaOH | 126.5 | 57.0 | 69.5 | 0 | 0.6 | 0$^{6.4}$ | 636 |
| 8 | A—2 h | 58.0 | 25.0 | 33 | 0 | 0.6 | 0$^{5.5}$ | 536 |
| 9 | B—1 h | 101.5 | 51.5 | 50 | 1.5 | 0$^{1.6}$ | 5 | 520 |
| 10 | B—1¼ h | 79 | 38.5 | 40.8 | 0 | 0.6 | 3.8 | 584 |
| 11 | B—1½ h | 75 | 39 | 36 | 3 | 0.6 | 0$^{16.5}$ | 576 |
| 12 | Ex. 11 + .25 g. NaOH | 74.5 | 32.5 | 42 | 0 | 0.6 | 4.8 | 472 |
| 13 | B—2 h | 79 | 42.5 | 36.5 | 6 | 0$^1$ | 0$^{26.5}$ | 624 |
| 14 | C—1 h | 107.5 | 53.4 | 54 | 0 | 0.8 | 0$^{23.5}$ | 576 |
| 15 | Ex. 14 + .25 g. NaOH | 176.5 | 89 | 87.5 | 1.5 | 0.6 | 0$^{10}$ | 480 |
| 16 | C—1½ h | 89 | 40 | 49 | 0 | 0.6 | 0$^{17.8}$ | 592 |
| 17 | C—2 h | 61.5 | 32.5 | 29 | 3.5 | 0$^1$ | 0$^{19.5}$ | 608 |
| 18 | C—20 m/454 | 77.5 | 38 | 39.5 | 0 | 0.6 | 3.7 | 520 |
| 19 | A—18 m/454 | 71.5 | 38.5 | 33 | 5.5 | 0$^{1.2}$ | 0$^{23.5}$ | 536 |
| 20 | A—28 m/427 | 103.5 | 53 | 50.5 | 2.5 | 0.8 | 0$^3$ | 592 |
| 21 | C—3 h./394 | 62.5 | 31 | 31 | 0 | 0$^1$ | | 540 |

$^1$ Apparent viscosity is one-half this value in all examples.
$^2$ West Cote Blanche Bay mud containing about 15% by volume of low gravity solids is the base mud in all examples herein.
$^3$ In examples, time/temperature, ° F.

The preoxidized starches referred to in Table I above are commercially available hypochlorite oxidized corn starches having the following representative properties:

TABLE II

| | A | B | C |
|---|---|---|---|
| Ash content, percent | 1.5 | 0.3 | 0.7 |
| pH | 7.2 | 7.2 | 5.5 |
| Maximum solids content generally used in cooked solutions, percent | 25 | 10 | 18 |
| Viscosity of 10% aqueous solution at 130° F. after heating at 195° F. for 30 minutes | 6 | 60 | .20 |

The appearance of the drilling fluid of Ex. 22, after heating, was plastic whereas the drilling fluids of Ex. 23–27 were fluid.

The novel modified starch dextrin was also used in several other types of water base muds containing about 15% by volume of low gravity clay solids, with the good results listed in Table V below, showing yield point and gel strength values comparable to some of the commercial dispersants, such as Q-Broxin, Spersene and Unical, modified lignosulfonates.

Ex. 30 and 31—5 dispersant, 5 gypsum—1NaOH
Ex. 32—8 dispersant—0.25 NaOH
Ex. 33 and 34—8 dispersant—1 NaOH The drilling fluids of these examples contained the following materials and amounts, expressed in terms of pounds per barrel of drilling fluid:

TABLE IV

| Ex. | Dispersant | Fann Reading, r.p.m. | | PV | YP | Gels | | pH | Ca (p.p.m.) |
|---|---|---|---|---|---|---|---|---|---|
| | | 600 | 300 | | | 0[1] | 10' | | |
| 29 | None | 70 | 59 | 11 | 48 | 50 | 60+ | 7.2 | 680 |
| 30 | Q-Broxin [1] | 96.5 | 52 | 44.5 | 7.5 | 0[1] | 0[27] | 9.9 | 620 |
| 31 | C—3 h./394 | 48 | 26 | 22 | 2 | 0[1] | 0[26] | 9.6 | |
| 32 | ----do---- | 72.5 | 43 | 29.5 | 13.5 | 0[1.2] | 3.5 | 9.4 | |
| 33 | Spersene [1] | 30 | 15 | 15 | 0 | 0[1] | 0[1] | 10.2 | |
| 34 | Unical [1] | 50 | 25 | 25 | 0 | 0[1] | 0[1] | 9.4 | |

[1] A ferrochrome lignosulfonate.

The foregoing data demonstrate that the present invention imparts to aqueous drilling fluids improved dispersibility as shown by the lower yield points obtained in Examples 31 and 32 compared with Example 29 containing the base mud. The degree of dispersibility obtained by the novel dispersants is about the same or somewhat better than that obtained using the commercially available dispersants in Examples 30, 33 and 34. Furthermore, the data in the table for Examples 31 and 32 also demonstrate improved mud stability as is evidenced by the reduction in gel strength at room temperature, in comparison with the base mud of Example 29; and gel strengths comparable to or even lower than those obtained with Examples 30, 33 and 34.

The novel dextrin dispersant of the invention can also be used successfully in drilling muds containing additives other than those mentioned previously herein. For example, it can be used in a mud containing chromate salts such as sodium chromate which has previously been added to protect the mud against temperature degradation.

Furthermore, the novel dextrin can be prepared from preoxidized starches other than corn starch, e.g., starch from arrow root, tapioca, sago and potato.

Obviously, many modifications and variations of the invention, as hereinbefore set forth, may be made without departing from the spirit and scope thereof, and therefore only such limitations should be imposed as are indicated in the appended claims.

I claim:

1. An aqueous well drilling fluid containing at least about 0.5 pound per barrel of a modified starch dextrin produced by subjecting a hypochlorite preoxidized starchy material to a temperature above 300° F. but below a temperature at which combustion occurs for a period of time between about at least 15 minutes and 6 hours to provide improved dispersibility and improved high temperature stability to said well drilling fluid, said modified starch dextrin being fully soluble in aqueous caustic solution and being at least about 90% by weight insoluble in boiling water.

2. An aqueous well drilling fluid in accordance with claim 1 wherein said period of time is between about 1 and 3 hours.

3. An aqueous drilling fluid in accordance with claim 1 wherein said temperature is between 350° and 400° F.

4. An aqueous well drilling fluid in accordance with claim 1 wherein said modified starch dextrin is present in an amount between 0.5 and 15 pounds per barrel of fluid.

5. An aqueous well drilling fluid in accordance with claim 1 also comprising an alkaline aqueous phase comprising a saturated aqueous calcium hydroxide solution and a water-soluble calcium salt which has a solubility in said aqueous phase greater than that of calcium hydroxide dissolved therein to yield a calcium ion concentration in said aqueous phase of at least 200 parts per million by weight and sufficient to effectively stabilize and control the mud-making properties of heaving shale material in contact with the drilling fluid, said aqueous phase having a pH not greater than about 12.6.

6. In the art of drilling wells wherein a drilling fluid is passed through the well in contact with earth formations during the drilling operation, the improvement which comprises contacting said earth formations with an aqueous drilling fluid containing at least about 0.5 pound per barrel of a heat modified starch dextrin produced by subjecting hypochlorite preoxidized starchy material to a temperature above 300° F. but below a temperature at which combustion occurs for a period of time between at least about 15 minutes and 6 hours sufficient to provide improved high temperature stability and improved dispersibility, said modified starch dextrin being fully soluble in aqueous caustic solution and being at least about 90% by weight insoluble in boiling water.

7. In the art of drilling wells in accordance with claim 6, said drilling fluid also comprising an alkaline aqueous phase which consists essentially of a saturated aqueous calcium hydroxide solution and a water-soluble calcium salt which has a solubility in said aqueous phase greater than that of calcium hydroxide dissolved therein to yield a calcium ion concentration in said aqueous phase of at least 200 parts per million by weight and sufficient to effectively stabilize and control the mud-making properties of heaving shale material in contact with the drilling fluid, said aqueous phase having a pH not greater than about 12.6.

8. A process for producing a modified starch dextrin product characterized by its ability to improve the high temperature stability and the dispersibility of an aqueous well drilling fluid when present therein in an amount of at least about 0.5 pound per barrel, said process comprising subjecting a hypochlorite preoxidized starchy material to a temperature above 300° F. but below the temperature at which combustion occurs for a period of time between at least about 15 minutes and 6 hours, said modified starch dextrin being fully soluble in aqueous caustic solution and being at least about 90% by weight insoluble in boiling water.

9. A process in accordance with claim 8 wherein said period of time is between about 1 and 3 hours.

10. A process in accordance with claim 8 wherein said temperature is between 350 and 400° F.

11. A heat modified starch dextrin product characterized by the ability to provide improved high temperature stability and improved dispersibility to an aqueous well drilling fluid, said product comprising the product obtained by subjecting a hypochlorite preoxidized starchy material starchy material to a temperature above 300° F. but below the temperature at which combustion occurs for a period of time between at least about 15 minutes and 6 hours, said starch dextrin product being fully soluble in aqueous caustic solution and being at least about 90% by weight insoluble in boiling water.

12. A modified starch dextrin product in accordance with claim 11 wherein said period of time is between about 1 and 3 hours.

13. A modified starch dextrin in accordance with claim 11 wherein said temperature is between 350° and 400° F.

14. A heat modified starch dextrin product suitable for use in an aqueous drilling fluid to improve the dispersibility and high temperature thereof when present therein in an amount between about 0.5 and 15 pounds per barrel of drilling fluid, said product having properties characteristic of a product resulting from subjecting hypochlorite preoxidized starch to a temperature between 350 and 400° F. for a period of time between 1 and 3 hours, said modified starch dextrin being fully soluble in aqueous caustic solution and being at least about 90% by weight insoluble in boiling water.

References Cited by the Examiner

UNITED STATES PATENTS

| | | | |
|---|---|---|---|
| 2,014,799 | 9/1935 | Fuller | 127—38 |
| 2,070,576 | 2/1937 | Bochskandl | 127—38 |
| 2,417,307 | 3/1947 | Larsen | 252—815 |
| 2,557,473 | 6/1951 | Ryan | 252—8.5 |
| 2,604,447 | 7/1952 | Cummer et al. | 252—8.5 |
| 2,802,783 | 7/1957 | Weiss et al. | 252—8.5 |
| 2,818,357 | 12/1957 | Ziegler et al. | 127—38 |
| 2,951,776 | 9/1960 | Scallet et al. | 127—38 |
| 3,232,871 | 2/1966 | Walker et al. | 252—8.5 |

LEON D. ROSDOL, *Primary Examiner.*

JULIUS GREENWALD, *Examiner.*

H. B. GUYNN, *Assistant Examiner.*

UNITED STATES PATENT OFFICE
CERTIFICATE OF CORRECTION

Patent No. 3,314,883　　　　　　　　　　　　　　　　April 18, 1967

Clarence O. Walker

It is hereby certified that error appears in the above numbered patent requiring correction and that the said Letters Patent should read as corrected below.

Column 4, line 58, for "sceonds" read -- seconds --; columns 5 and 6, in TABLE I, ninth column, line 8 thereof, for "636" read -- 536 --; same TABLE I, eighth column, line 12 thereof, for "3·8" read -- 3.8 --; same TABLE I, fourth column, line 15 thereof, for "53.4" read -- 53.5 --; column 5, TABLE II, first column, line 6 thereof, for "$0 minutes" read -- 20 minutes --; columns 5 and 6, TABLE III, seventh column, lines 2 and 5 thereof, for "0,8", each occurrence, read -- 0·8 --; same TABLE III, seventh column, line 7 thereof, for "0²,2" read -- $0^{2\cdot 2}$ --; column 8, line 70, strike out "starchy material".

Signed and sealed this 14th day of November 1967.

(SEAL)
Attest:

EDWARD M. FLETCHER, JR.　　　　　　　　　　　　　EDWARD J. BRENNER
Attesting Officer　　　　　　　　　　　　　　　　Commissioner of Patents